Patented May 17, 1938

2,117,936

UNITED STATES PATENT OFFICE 2,117,936

DERIVATIVES OF PYRIDINE AND QUINOLINE AND THEIR PREPARATION

Leslie G. S. Brooker and Grafton H. Keyes, Rochester, N. Y., assignors, by mesne assignments, to Eastman Kodak Company, Jersey City, N. J., a corporation of New Jersey No Drawing. Application August 9, 1934, Serial No. 739,127

15 Claims. (Cl. 260—41)

This invention relates to new chemical compounds and more particularly to new quaternary salts of substituted-mercapto derivatives of heterocyclic nitrogen bases and a method of preparation thereof.

An object of this invention is to provide such quaternary salts of substituted-mercapto derivatives of pyridine bases and of quinoline bases as are useful in preparing cyanine dyes. A further object is to provide a process for the preparation of quaternary salts of substituted-mercapto derivatives of pyridine bases and quinoline bases. Other objects will appear hereinafter.

These objects are accomplished by allowing a mercaptan to react with a quaternary salt of an iodo derivative of a pyridine base or of a quinoline base. Hydrogen iodide is eliminated in the process.

The new compounds arrived at by such a process have the following general structural formula:

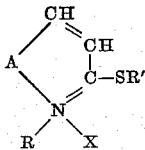

wherein A equals a vinylene group or a phenylene group, R equals an alkyl or substituted alkyl group such as methyl, ethyl or benzyl, R' equals an alkyl or substituted alkyl group such as methyl, ethyl, n-butyl or benzyl, or an aryl group such as phenyl, p-tolyl, β-naphthyl, p-chlorophenyl, 2,5-dichlorophenyl, or a heterocyclic group such as benzothiazolyl or pyrazolonyl, X equals an acid radical such as halide, p-toluenesulfonate, perchlorate or any other suitable anion. The positions 3, 4, 5, 6, 7 and 8 can be occupied by hydrogen atoms, alkyl groups or any other simple substituent which does not adversely affect the formation of these compounds. The numbering system shown in the above formulas is conventional and will be used exclusively herein.

It will be understood that the structural formulas indicated for these new compounds are given so that one skilled in the art can more readily understand the composition of these compounds. Whether or not the chemical structure given is absolutely correct is not intended to limit the scope of this invention, as the examples herein stated will enable the skilled organic chemist to prepare these compounds. However, the formulas given are those indicated by the chemical properties of these compounds and agrees with the analytical evidence.

A typical reaction illustrating the chemistry of the preparation of one of these new substituted-mercapto derivatives is disclosed in the following equation in which the reactants are the quaternary salt of an iodo derivative of quinoline, 2-iodo-quinoline ethiodide, a mercaptan, phenyl mercaptan (thiophenol), and triethylamine. The reaction products are a quaternary salt of a substituted-mercapto derivative of quinoline, 2-phenylthio quinoline, and triethylamine hydroiodide.

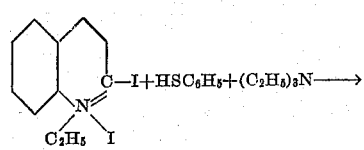

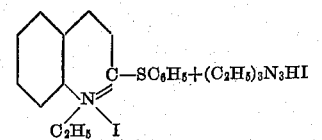

This reaction is merely an illustration and is not intended to limit the appended claims.

A typical procedure for the preparation of one of these new compounds is disclosed in the following statements. The appropriate mercaptan is allowed to react with a 2-iodopyridine alkiodide or a 2-iodoquinoline alkiodide in the presence of a material which will absorb the elements of acid eliminated during the reaction, but which will not otherwise adversely affect the reaction. A tertiary organic base is very suitable for this purpose. The reaction is conveniently carried out in a lower aliphatic alcohol, preferably absolute ethyl alcohol. The iodopyridine or iodoquinoline derivative is suspended in the solvent (alcohol), the mercaptan added and the whole heated. The strong tertiary organic base is added, when the reaction proceeds very rapidly and is complete after a few minutes' boiling. Ether precipitates the product, which is recrystallized from methyl alcohol. Further details of the method of preparing these compounds will be found in the examples.

We will now present a number of examples of the preparation of various substituted-mercapto derivatives. It will be understood that these examples are merely representative of a great number of methods in which the proportions given and the equivalents used may vary in accord with the particular substituted-mercapto derivatives being prepared.

*Example 1.*—2-Phenylthio-quinoline ethiodide. 20.5 g. (1 mol.) of 2-iodoquinoline ethiodide, 5.75 g. (1.05 mols) of phenyl mercaptan, 5.5 g.

(1.05 mols) triethylamine and 120 cc. of absolute ethyl alcohol were heated to boiling under reflux for a few minutes. The solids dissolved, giving a solution colored reddish with a little impurity. After cooling, the product was precipitated by the addition of ether, and was then washed with fresh ether. It was recrystallized from methyl alcohol and was obtained as orange yellow crystals, melting point 181–182° C. (corrected). After further recrystallization the melting point was constant at 182–183° C. (corrected). The product is very soluble in methyl alcohol and in acetic acid, slightly soluble in acetone and insoluble in benzene and in ether.

$C_{17}H_{16}NIS$ requires
C–51.89, H–4.10, N–3.56, I–32.28, S–8.15%.
Found
C–51.99, H–4.05, N–3.76, I–32.18, S–7.92%.

2-Phenylthio-quinoline methiodide similarly obtained from 2-iodo quinoline methiodide has a melting point of 184–5° C.

Example 1a.—2-(p-Tolylthio)-quinoline ethiodide was formed when p-tolyl mercaptan was used instead of phenyl mercaptan in the first part of the preceding example. The recrystallized compound has a melting point of 226–8° C. and consists of yellow crystals.

Example 2.—2-(β-Naphthylthio)-quinoline ethiodide.

8.2 g. (1 mol.) of 2-iodoquinoline ethiodide, 3.2 g. (1 mol.) of β-naphthyl mercaptan, 2.0 g. (1 mol.) of triethylamine and 40 cc. of absolute ethyl alcohol were boiled under reflux for several minutes. The product separated on cooling. It was purified by recrystallization from methyl alcohol, and was obtained as yellow crystals, melting point 221–222° C.

$C_{21}H_{18}NIS$ requires C–56.87, H 4.09%.
Found C–56.50, H 4.20%.

If 2-iodo-6-methyl quinoline (1 mol.) is used in place of the 2-iodo quinoline ethiodide, the product is 6-methyl-2-(β-naphthylthio)-quinoline ethiodide. This melts at 220–221° C.

Example 3.—2-(2,5-Dichlorophenylthio)-quinoline ethiodide.

2.05 g. (1 mol.) of 2-iodoquinoline ethiodide, 0.9 g. (1 mol.) of 2,5-dichlorophenyl mercaptan, 0.5 g. (1 mol.) of triethylamine and 20 cc. of absolute ethyl alcohol were refluxed several minutes. The clear solution deposited crystals of the product upon cooling. Yield 69%. Recrystallization from methyl alcohol gives the pure product of melting point 205–7° C. (decomposition).

$C_{17}H_{14}NCl_2IS$ requires C–44.16, H–3.05%.
Found C–44.00, H–3.10%.

Example 4.—2-(p-Chlorophenylthio)-quinoline ethiodide.

This compound was obtained similarly to the product obtained in Example 3 by using p-chlorophenyl mercaptan instead of 2,5-dichlorophenyl mercaptan. The pure compound consists of yellow crystals and melts at 203–5° C. (decomposition).

Example 5.—2-(n-Propylthio)-quinoline ethiodide.

2.05 g. (1 mol.) of 2-iodoquinoline ethiodide, 0.4 g. (1 mol.) of n-propyl mercaptan, 0.5 g. (1 mol.) of triethylamine and 20 cc. of ethyl alcohol were boiled together under reflux for several minutes. The product crystallized out upon chilling and was removed, washed with acetone and dried. It was recrystallized from ethyl alcohol and obtained as yellow crystals. Melting point 177–9° C.

Example 6.—2-(n-Butylthio)-quinoline ethiodide.

This compound was obtained by using n-butyl mercaptan as in the preceding example. The pure product, recrystallized from methyl alcohol, has a melting point of 149–151° C. and consists of yellow crystals.

Example 7.—2-(1-Benzothiazolylthio)-quinoline ethiodide.

This compound is produced when 1-mercaptobenzothiazole is used as the mercaptan. The pure compound, recrystallized from methyl alcohol, has a melting point of 180–181° C.

Example 8.—2-(β-Naphthylthio)-pyridine methiodide.

3.5 g. (1 mol.) of 2-iodopyridine methiodide, 1.6 g. (1 mol.) of β-naphthyl mercaptan, 1.0 g. (1 mol.) of triethylamine and 20 cc. of ethyl alcohol were boiled under reflux for several minutes. When cold, the product was precipitated by adding ether and was purified by recrystallization from methyl alcohol. It was obtained as pale yellow crystals. Melting point 185–7° C.

$C_{16}H_{14}NIS$ requires C–50.65, H–3.72%.
Found C–50.70, H–3.70%.

Example 9.—2(2,5-Dichlorophenylthio)-pyridine ethiodide.

This compound was obtained by the use of 2,5-dichlorophenyl mercaptan and 2-iodopyridine ethiodide. On recrystallization from methyl alcohol the pure compound was obtained in the form of pale yellow crystals. Melting point 151–2° C.

Example 10.—2-(p-Chlorophenylthio)-pyridine methiodide.

This compound, similarly prepared as the above, was obtained upon recrystallization from methyl alcohol as pale yellow crystals. Melting point 185–7° C.

In the above examples the yields of products varied from 50% to 93%.

While these compounds are of notable utility in the preparation of cyanine dyes, they can be used for any other desired purpose.

What we claim as our invention and desire to be secured by Letters Patent of the United States is:

1. A quaternary salt of the following formula:

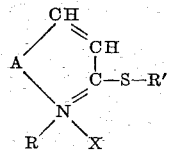

wherein A represents an organic group selected from the group consisting of vinylene and phenylene groups, R represents an alkyl group, R' represents an aryl group containing not more than two benzene rings, the S being directly attached to a benezene ring of said aryl group, and X represents an acid radical.

2. A quaternary salt of the following formula:

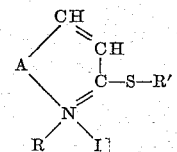

wherein A represents an organic group selected from the group consisting of vinylene and phenylene groups, R represents an alkyl group, R' represents an aryl group containing not more than two benzene rings, the S being directly attached to a benzene ring of said aryl group.

3. An ethiodide of 2-(phenylthio)-quinoline.

4. A process for the preparation of a quaternary salt which comprises condensing one molecular proportion of a mercaptan with one molecular proportion of a quaternary salt of the following structure:

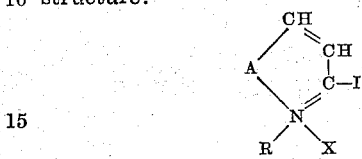

wherein R represents an alkyl group, A represents a group selected from the group consisting of vinylene and phenylene groups, and X represents an acid radical, in the presence of a strong tertiary organic base.

5. A process for the preparation of a quaternary salt which comprises condensing one molecular proportion of a mercaptan with one molecular proportion of a quaternary salt of the following structure:

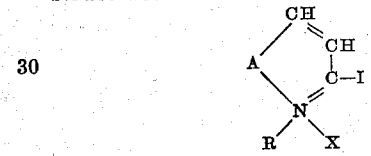

wherein R represents an alkyl group, A represents a vinylene or phenylene group, and X represents an acid radical, in the presence of a basic condensing agent.

6. A process for the preparation of a quaternary salt which comprises condensing, under the influence of heat, one molecular proportion of a mercaptan with one molecular proportion of a quaternary salt of the following structure:

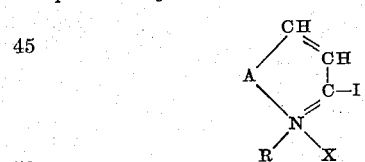

wherein R represents an alkyl group, A represents a group selected from the group consisting of vinylene and phenylene groups and X represents an acid radical, in the presence of a lower aliphatic alcohol and a tertiary organic base.

7. A process for the preparation of a quaternary salt which comprises condensing one molecular proportion of a mercaptan with one molecular proportion of a quaternary salt of the following structure:

wherein R represents an alkyl group, A represents a group selected from the group consisting of vinylene and phenylene groups, and X represents an acid radical, in the presence of a trialkylamine.

8. A process for the preparation of an alkiodide which comprises condensing, under the influence of heat, one molecular proportion of a mercaptan with one molecular proportion of an alkiodide of the following structure:

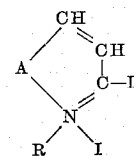

wherein R represents an alkyl group and A represents a group selected from the group consisting of vinylene and phenylene groups, in the presence of a lower aliphatic alcohol and a strong tertiary organic base.

9. A process for the preparation of an alkiodide which comprises condensing, under the influence of heat, one molecular proportion of a mercaptan with one molecular proportion of an alkiodide of the following structure:

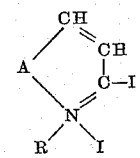

wherein R represents an alkyl group and A represents a group selected from the group consisting of vinylene and phenylene groups, in the presence of a lower aliphatic alcohol and triethylamine.

10. A process for the preparation of an alkiodide which comprises condensing, under the influence of heat, one molecular proportion of an aliphatic mercaptan with one molecular proportion of an alkiodide of the following structure:

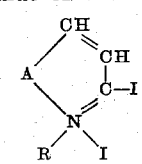

wherein R represents an alkyl group and A represents a group selected from the group consisting of vinylene and phenylene groups, in the presence of a lower aliphatic alcohol and triethylamine.

11. A process for the preparation of an alkiodide which comprises condensing, under the influence of heat, one molecular proportion of an aromatic mercaptan containing not more than one benzene ring with one molecular proportion of an alkiodide of the following structure:

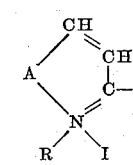

wherein R represents an alkyl group and A represents a group selected from the group consisting of vinylene and phenylene groups, in the presence of a lower aliphatic alcohol and triethylamine.

12. A process for the preparation of an alkiodide which comprises condensing, under the influence of heat, one molecular proportion of a heterocyclic mercaptan with one molecular proportion of an alkiodide of the following structure:

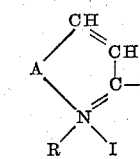

wherein R represents an alkyl group and A represents a group selected from the group consisting of vinylene and phenylene groups, in the presence of a lower aliphatic alcohol and triethylamine.

13. A process for the preparation of the ethiodide of 2-(n-propylthio) quinoline which comprises condensing, under the influence of heat, one molecular proportion of n-propyl mercaptan with one molecular proportion of the ethiodide of 2-iodoquinoline in the presence of a lower aliphatic alcohol and triethylamine.

14. A process for the preparation of the ethiodide of 2-phenylthio quinoline which comprises condensing, under the influence of heat, one molecular proportion of phenyl mercaptan with one molecular proportion of the ethiodide of 2-iodoquinoline in the presence of a lower aliphatic alcohol and triethylamine.

15. A process for the preparation of the ethiodide of 2-(1-benzothiazolylthio) quinoline which comprises condensing, under the influence of heat, one molecular proportion of 1-mercaptobenzothiazole with one molecular proportion of the ethiodide of 2-iodoquinoline, in the presence of a lower aliphatic alcohol and triethylamine.

LESLIE G. S. BROOKER.
GRAFTON H. KEYES.